US012734744B2

(12) United States Patent
Zou et al.

(10) Patent No.: US 12,734,744 B2
(45) Date of Patent: Sep. 15, 2026

(54) BOTTLE PREFORM HEATING APPARATUS

(71) Applicant: GUANGZHOU TECH-LONG PACKAGING MACHINERY CO., LTD, Guangzhou (CN)

(72) Inventors: Daqun Zou, Guangzhou (CN); Zhijun Deng, Guangzhou (CN); Guanyuan Zeng, Guangzhou (CN); Jingfeng Liu, Guangzhou (CN)

(73) Assignee: GUANGZHOU TECH-LONG PACKAGING MACHINERY CO., LTD, Guangdong (CN)

( * ) Notice: Subject to any disclaimer, the term of this patent is extended or adjusted under 35 U.S.C. 154(b) by 679 days.

(21) Appl. No.: 18/037,187

(22) PCT Filed: Aug. 19, 2021

(86) PCT No.: PCT/CN2021/113501
§ 371 (c)(1),
(2) Date: May 16, 2023

(87) PCT Pub. No.: WO2023/000423
PCT Pub. Date: Jan. 26, 2023

(65) Prior Publication Data
US 2024/0017473 A1 Jan. 18, 2024

(30) Foreign Application Priority Data
Jul. 21, 2021 (CN) ......................... 202110825258.5

(51) Int. Cl.
*B29C 49/68* (2006.01)
*B29C 49/64* (2006.01)
(Continued)

(52) U.S. Cl.
CPC .......... *B29C 49/68* (2013.01); *B29C 49/6418* (2013.01); *H05B 3/0057* (2013.01);
(Continued)

(58) Field of Classification Search
CPC . H05B 3/0057; B29C 49/6418; B29C 49/071; B29C 49/681; B29C 49/6855
See application file for complete search history.

(56) References Cited

U.S. PATENT DOCUMENTS 5,282,878 A * 2/1994 Komiyama ............. C03B 11/12
65/102
6,005,223 A * 12/1999 Ogihara ................ B29C 49/682
219/404
(Continued)

FOREIGN PATENT DOCUMENTS

CN 107322907 11/2017
CN 107322907 A * 11/2017 ......... B29C 49/6418
(Continued)

OTHER PUBLICATIONS

International Search Report in related PCT/CN2021/113501 mailed Apr. 19, 2022.
(Continued)

*Primary Examiner* — Thien S Tran
(74) *Attorney, Agent, or Firm* — Woodard, Emhardt, Henry, Reeves & Wagner, LLP

(57) ABSTRACT

A bottle preform heating apparatus includes a cavity, a top cover and multiple heating lamps. A first receiving cavity and a second receiving cavity are formed in the cavity. The first receiving cavity is cylindrical. The second receiving cavity is connected to a side surface of the first receiving cavity. Each heating lamp includes a lamp tube and a lamp base. The lamp tube includes an arc portion and two connection portions. An end of each connection portion is connected to the lamp base. Another end of the each connection portion is connected to an end of the arc portion. The arc portion is disposed in the first receiving cavity. The two connection portions and the lamp base are disposed in
(Continued)

the second receiving cavity. The top cover is disposed on top of the cavity. The top cover is provided with a first through hole.

7 Claims, 8 Drawing Sheets

(51) Int. Cl.

| | |
|---|---|
| ***B29K 67/00*** | (2006.01) |
| ***B29L 31/00*** | (2006.01) |
| ***H05B 3/00*** | (2006.01) |

(52) U.S. Cl.
CPC . *B29K 2067/003* (2013.01); *B29L 2031/7158* (2013.01); *H05B 2203/032* (2013.01)

(56) References Cited

U.S. PATENT DOCUMENTS

| | | | | |
|---|---|---|---|---|
| 2012/0267357 | A1* | 10/2012 | Monteix | B29C 49/06 219/411 |
| 2017/0215232 | A1* | 7/2017 | Feuilloley | B29C 35/0805 |

FOREIGN PATENT DOCUMENTS

| | | |
|---|---|---|
| CN | 207105595 | 3/2018 |
| CN | 207724819 | 8/2018 |
| CN | 207916024 | 9/2018 |
| CN | 212266636 | 1/2021 |
| EP | 0 835 736 | 4/1998 |
| ES | 2390453 | 11/2012 |
| GB | 2 050 919 | 1/1981 |
| JP | H07205997 | 8/1995 |
| JP | H11188785 | 7/1999 |
| JP | 3330717 | 9/2002 |
| JP | 2006297676 | 11/2006 |
| JP | 2008505777 | 2/2008 |
| JP | 2014065295 | 4/2014 |
| WO | WO 2019/104394 | 6/2019 |

OTHER PUBLICATIONS

Office Action in related CN202110825258.5 mailed Sep. 20, 2022.

Office Action in related JP2023-521693 drafted Feb. 27, 2024.

European Search Report for related EP21950665.6 malled Oct. 2, 2024.

* cited by examiner

BOTTLE PREFORM HEATING APPARATUS

CROSS-REFERENCE TO RELATED APPLICATION(S)

This is a national stage application filed under 35 U.S.C. 371 based on International Patent Application No. PCT/CN2021/113501, filed Aug. 19, 2021, which claims priority to Chinese Patent Application No. 202110825258.5, filed with the China National Intellectual Property Administration (CNIPA) on Jul. 21, 2021, the disclosures of which isare incorporated herein by reference in their entireties.

TECHNICAL FIELD

The present application relates to the field of packaging machinery, for example, a bottle preform heating apparatus.

BACKGROUND

At present, a plastic bottle with a handle on the market is mainly divided into two types. One type is an HDPE bottle with a built-in handle, and the other type is a PET bottle with a finished handle. An HDPE bottle with a built-in handle has defects such as incomplete sealing, easy damage of the bottle body, and uncontrollable bottle capacity. Compared with an HDPE bottle, a PET bottle has advantages such as good sealing, strong bottle body, high oxygen resistance, and transparent and easy to observe. However, at present, a PET bottle requires a finished handle manufactured and mounted using a particular device. The handle mounted on a PET bottle is easy to fall off. These reasons have prompted relevant enterprises in the industry to hope to replace an existing plastic bottle with a built-in handle on the market with a PET bottle with a handle.

To produce a PET bottle with a built-in handle, it is required to injection mold, heat, and blow a PET bottle preform with a built-in handle. However, an existing bottle preform heating apparatus heats the bottle preform as a whole. As a result, the handle is deformed, and the bottle preform cannot be put into a bottle blowing mold smoothly.

SUMMARY

The present application provides a bottle preform heating apparatus, solving the problem of easy deformation of a handle to enable a bottle preform to be placed into a bottle blowing mold smoothly before blowing.

An embodiment provides a bottle preform heating apparatus. The apparatus includes a cavity, a top cover and multiple heating lamps. A first receiving cavity and a second receiving cavity are formed in the cavity. The first receiving cavity is cylindrical. The second receiving cavity is connected to a side surface of the first receiving cavity. Each heating lamp includes a lamp tube and a lamp base. The lamp tube includes an arc portion and two connection portions. An end of each connection portion is connected to the lamp base. Another end of the each connection portion is connected to an end of the arc portion. The arc portion is disposed in the first receiving cavity. The two connection portions and the lamp base are disposed in the second receiving cavity. The top cover is disposed on top of the cavity. The top cover is provided with a first through hole. A preform tube of a bottle preform is configured to pass through the first through hole so as to be inserted into the first receiving cavity and surrounded by the arc portion. The radius of the first receiving cavity is less than the distance between an end of a handle of the bottle preform facing away from the preform tube and the central axis of the preform tube.

In solution of the bottle preform heating apparatus of the present application, the bottle preform heating apparatus also includes a mounting base, where the mounting base is detachably connected to the cavity, the mounting base is disposed in the second receiving cavity, the mounting base is provided with multiple fixing holes disposed at intervals, the lamp base includes a fixing sheet, where the fixing sheet is provided with a U-shaped notch, and each heating lamp is fixed to the mounting base by a screw that passes through the U-shaped notch and that is screwed in a corresponding fixing hole.

In solution of the bottle preform heating apparatus of the present application, the bottle preform heating apparatus also includes multiple heat insulation rings, where a heat insulation ring is configured to be placed between two adjacent lamp tubes to surround the periphery of a corresponding arc portion.

In solution of the bottle preform heating apparatus of the present application, the multiple heat insulation rings are spaced apart from an inner wall of the cavity so that a heat insulation cavity is formed between the multiple heat insulation rings and the cavity.

In an optional solution of the bottle preform heating apparatus of the present application, the multiple heat insulation rings are spaced apart from an inner wall of the cavity so that a heat insulation cavity is formed between the multiple heat insulation rings and the cavity.

In solution of the bottle preform heating apparatus of the present application, the bottle preform heating apparatus also includes a bottom plate and an exhaust pipe, where the bottom of the cavity is disposed on the bottom plate, the exhaust pipe is detachably connected to the bottom plate, the bottom plate is provided with a second through hole, and the exhaust pipe passes through the second through hole and is inserted in the first receiving cavity.

In solution of the bottle preform heating apparatus of the present application, a gap exists between the bottom of the top cover and the top of the cavity, the gap communicates with the heat insulation cavity, and the heat insulation cavity communicates with the exhaust pipe.

In solution of the bottle preform heating apparatus of the present application, a side surface of the cavity is provided with an air inlet hole, and the air inlet hole communicates with the second receiving cavity.

In solution of the bottle preform heating apparatus of the present application, a first cooling cavity is disposed within the cavity, a first water inlet and a first water outlet are disposed on the surface of the cavity, and the first water inlet and the first water outlet communicate with the first cooling cavity.

In solution of the bottle preform heating apparatus of the present application, a second cooling cavity is disposed within the top cover, and a second water inlet and a second water outlet are disposed on the surface of the top cover, and the second water inlet and the second water outlet communicate with the second cooling cavity.

In solution of the bottle preform heating apparatus of the present application, the central axis of the preform tube inserted in the first receiving cavity coincides with the central axis of the first receiving cavity.

The bottle preform heating apparatus of the present application has a cavity of a particular size such that the preform tube of the bottle preform can pass through the first through hole on the top cover so as to be inserted into the first receiving cavity and surrounded by each heating lamp, while the handle of the bottle preform cannot be placed inside the cavity, and the heating lamps heat only the preform tube, thereby preventing the handle from being deformed by heat and thus creating conditions for subsequent smooth blowing of the bottle preform. Moreover, the shape of the cavity matches the shape of the heating lamps such that the arc portion included in each heating lamp and responsible for heating the preform tube is disposed in the first receiving cavity, and the connection portions and the lamp base of each heating lamp are disposed in the second receiving cavity, making the space in the cavity fully utilized, thereby making the cavity have a compact volume and occupy a small space and thus facilitating mounting.

REFERENCE LIST

Figure 1:
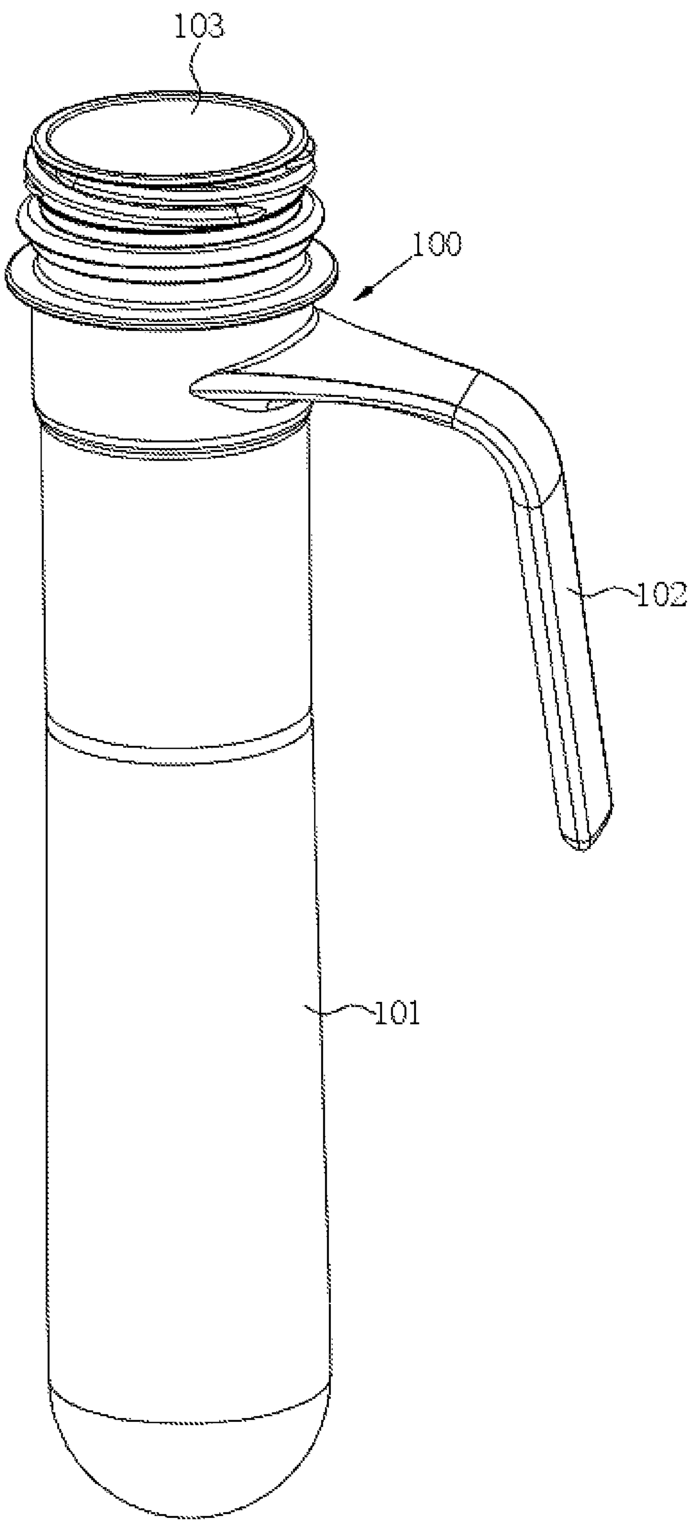
FIG. 1 is a perspective view of a bottle preform with a built-in handle.

1 cavity
11 first receiving cavity
111 heat insulation cavity
12 second receiving cavity
13 gap
14 air inlet hole
15 first cooling cavity
16 first water inlet
17 first water outlet
2 top cover
21 first through hole
22 second water inlet
23 second water outlet
3 heating lamp
31 lamp tube
311 arc portion
312 connection portion
32 lamp base
321 lamp base body
322 fixing sheet
4 mounting base
41 fixing hole
5 first screw
6 heat insulation ring
61 indentation
7 bottom plate
8 exhaust pipe
81 third through hole
9 second screw
100 bottle preform
101 preform tube
102 handle
103 bottle opening
104 bottle body

DETAILED DESCRIPTION

In the present application, unless expressly specified or limited otherwise, a first feature being "on" or "under" a second feature may include the first feature and the second feature being in direct contact, or may include the first feature and the second feature not being in direct contact but being in contact with each other through additional features therebetween. Moreover, the first feature being "on" the second feature includes the first feature being directly above and obliquely above the second feature, or simply indicates that the first feature is at a higher level than the second feature. The first feature being "under" the second feature includes the first feature being directly below and obliquely below the second feature, or simply represents that the first feature is at a lower level than the second feature.

In addition, terms "first", "second" are used only for the purpose of description and are not to be construed as indicating or implying relative importance or implicitly indicating a number of indicated technical features. Thus, a feature defined with "first" or "second" may explicitly or implicitly includes one or more of the features.

Figure 2:
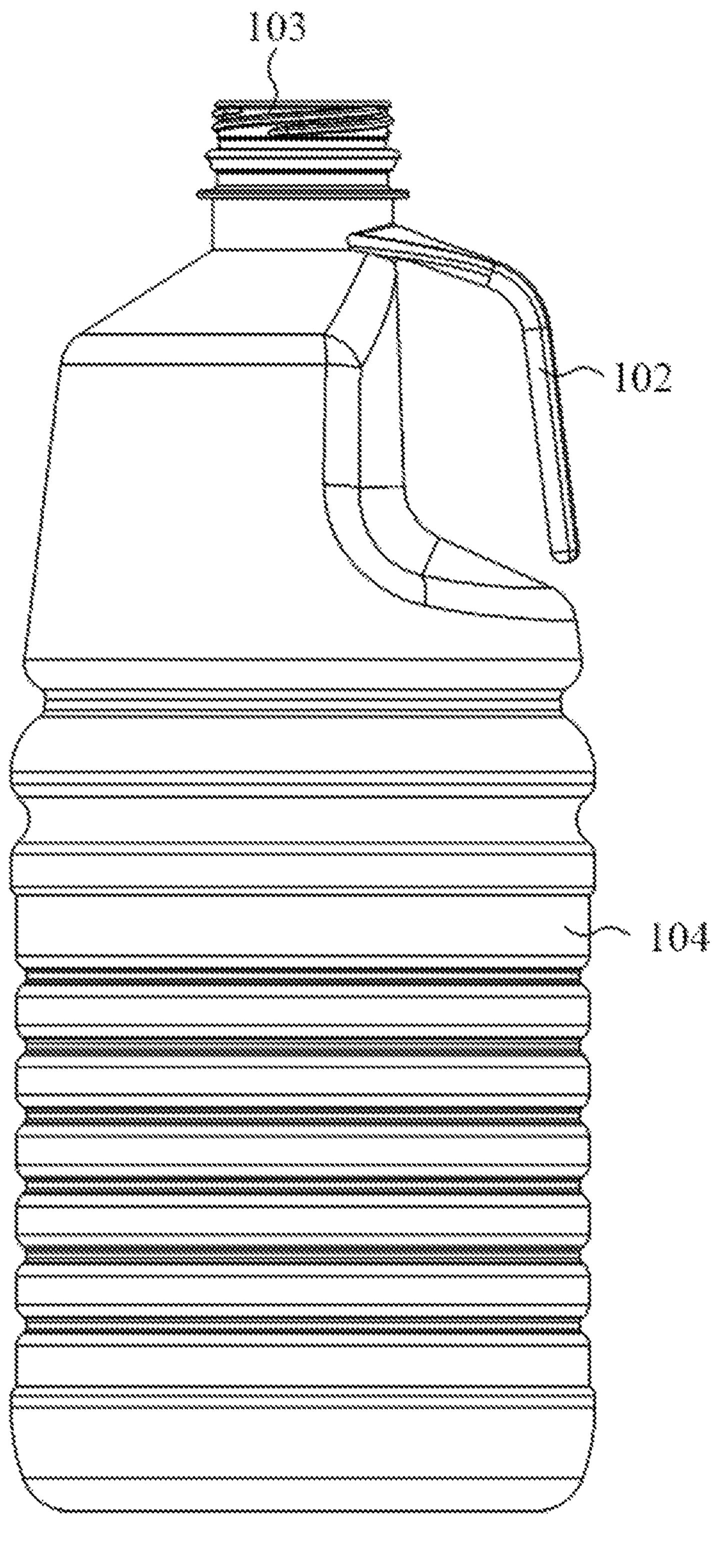
FIG. 2 is a front view of a bottle blown from the preform of FIG. 1.

The bottle preform 100 shown in FIG. 1 includes a preform tube 101, a handle 102 and a bottle opening 103. An end of the handle 102 is integrally connected to the preform tube 101. Another end of the handle 102 is not connected to the preform tube 101 and is in a suspended state. A bottle blown from the preform 100 is shown in FIG. 2. As shown in FIG. 2, the preform tube 101 is blown up to form a bottle body 104, while the state of the handle 102 and the state of the bottle opening 103 remain substantially unchanged.

An existing bottle preform heating apparatus heats the preform tube 101 and the handle 102 together. Since the handle 102 is heated, and an end of the handle 102 is in a suspended state, the handle 102 may deform. As a result, the handle 102 cannot fit into a corresponding groove of a bottle blowing mold, and the bottle blowing mold cannot be closed for bottle blowing.

Figure 3:
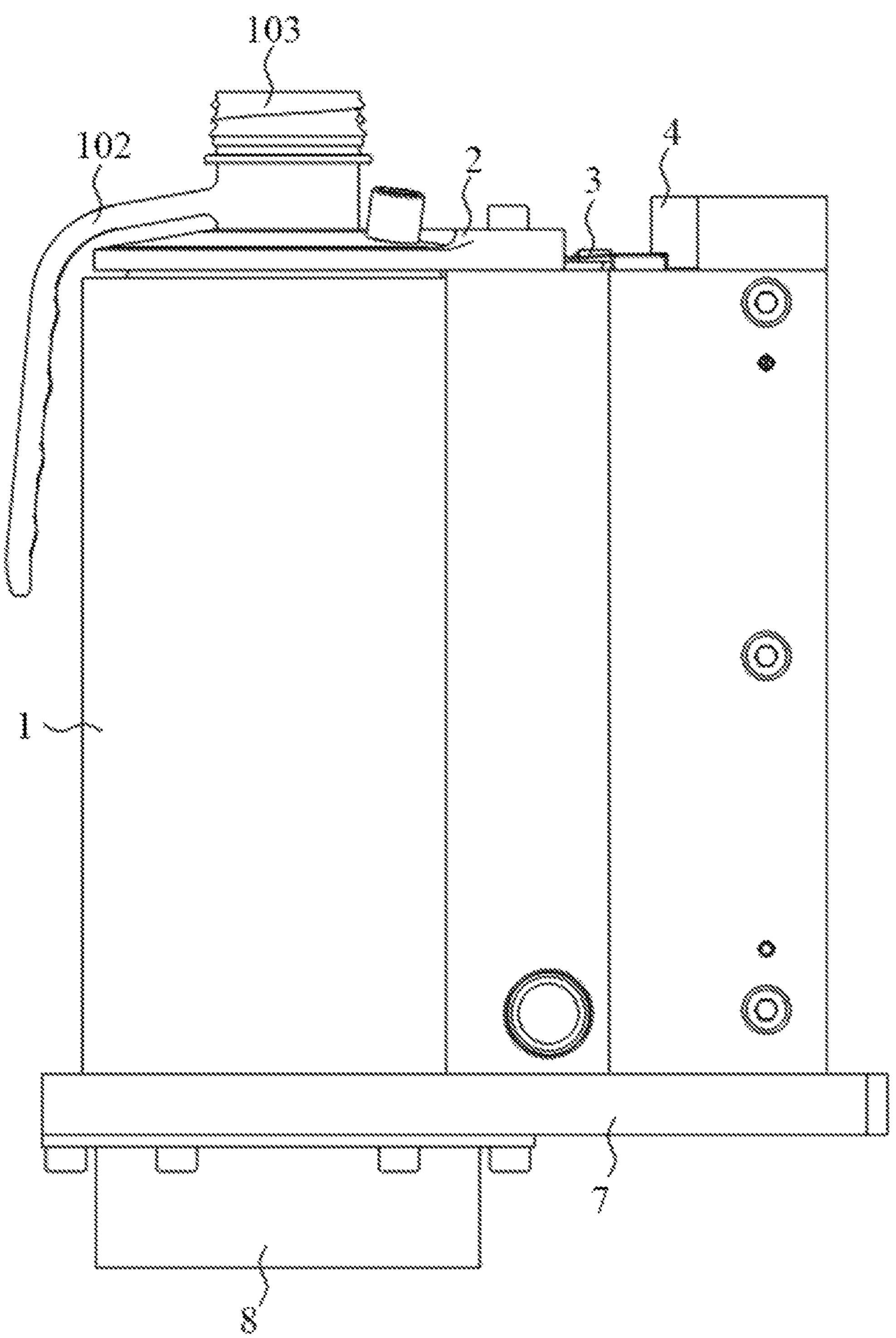
FIG. 3 is a front view of a bottle preform heating apparatus according to an embodiment of the present application.
Figure 4:
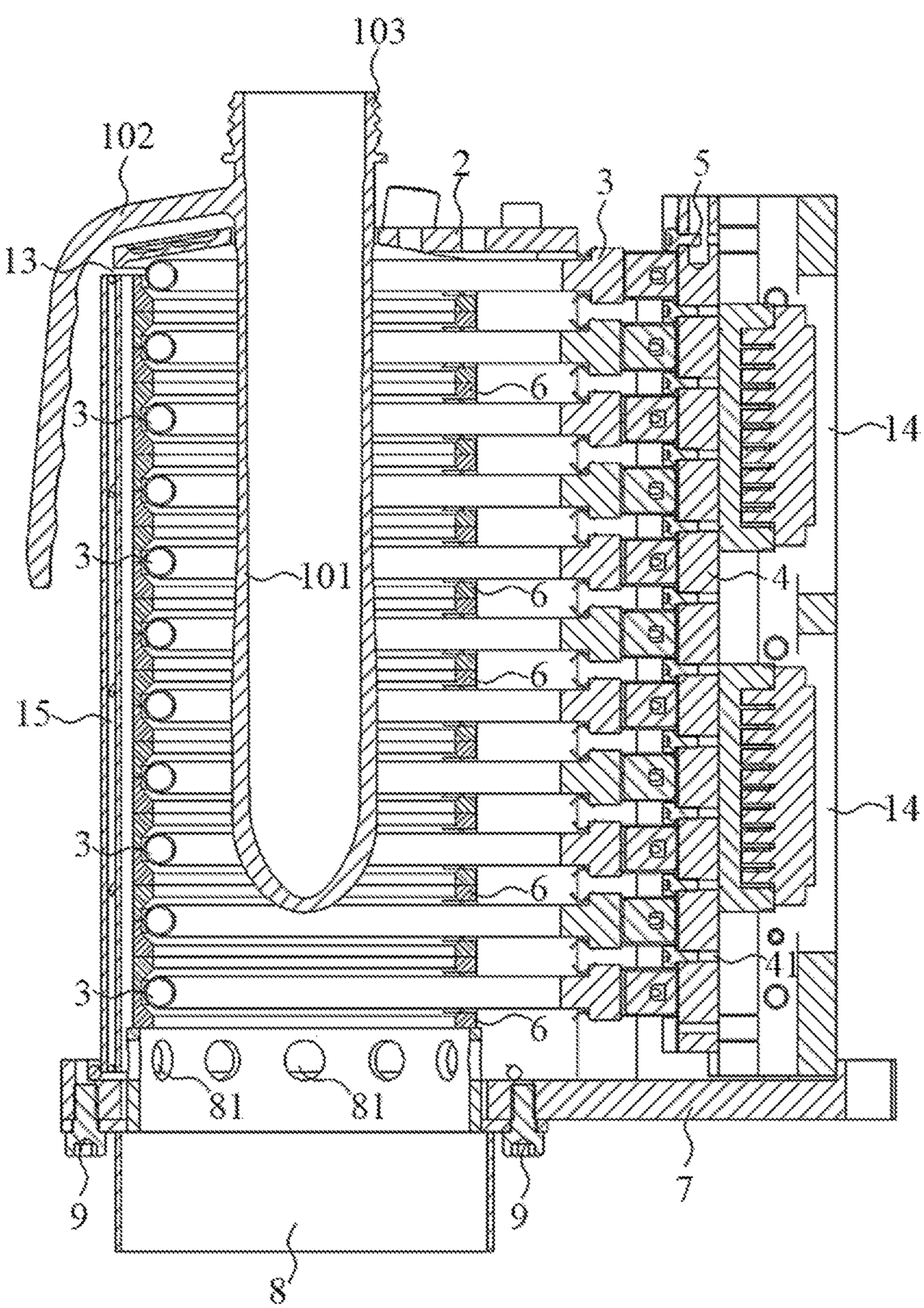
FIG. 4 is a section view of FIG. 3.
Figure 5:
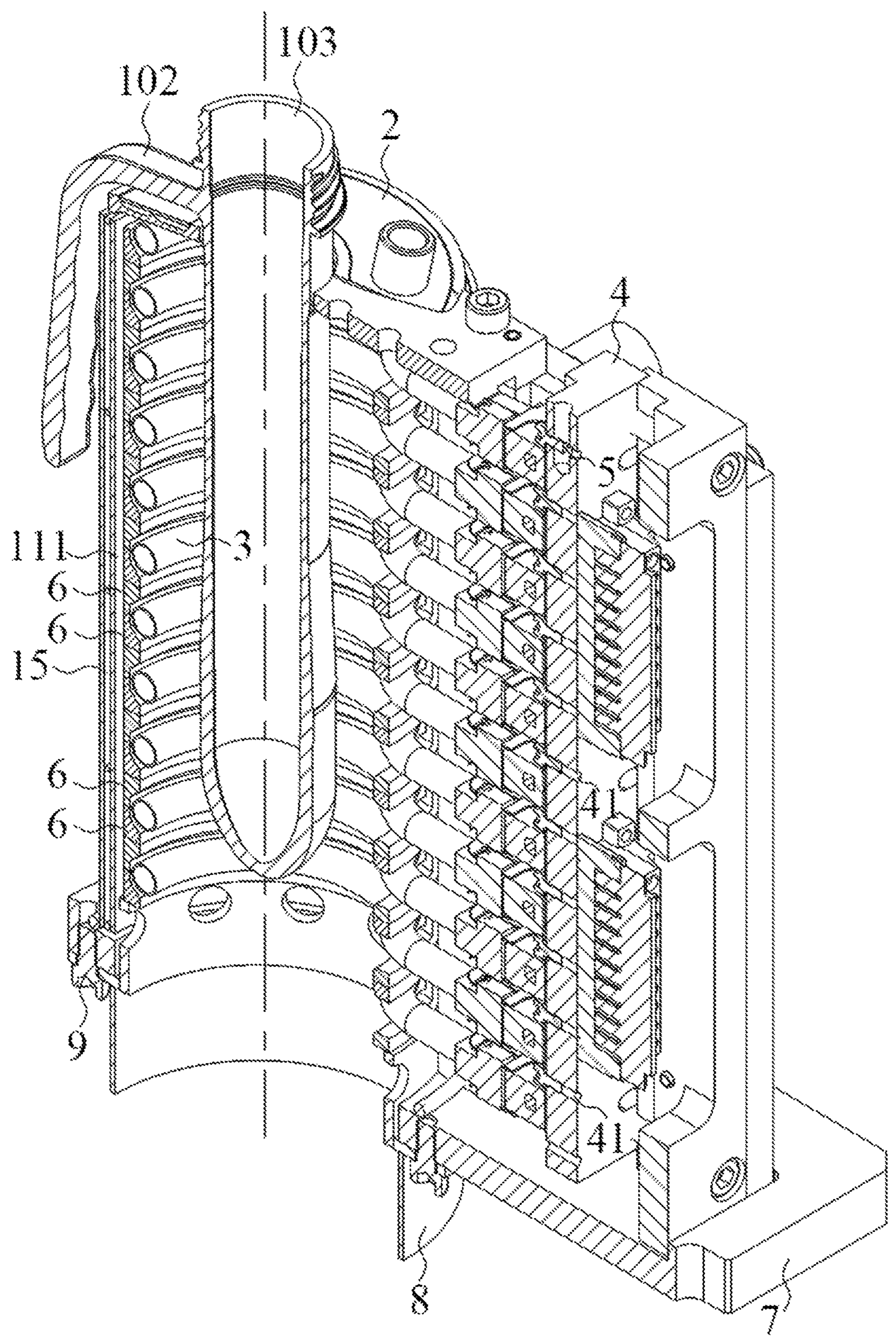
FIG. 5 is a perspective view of FIG. 4.
Figure 6:
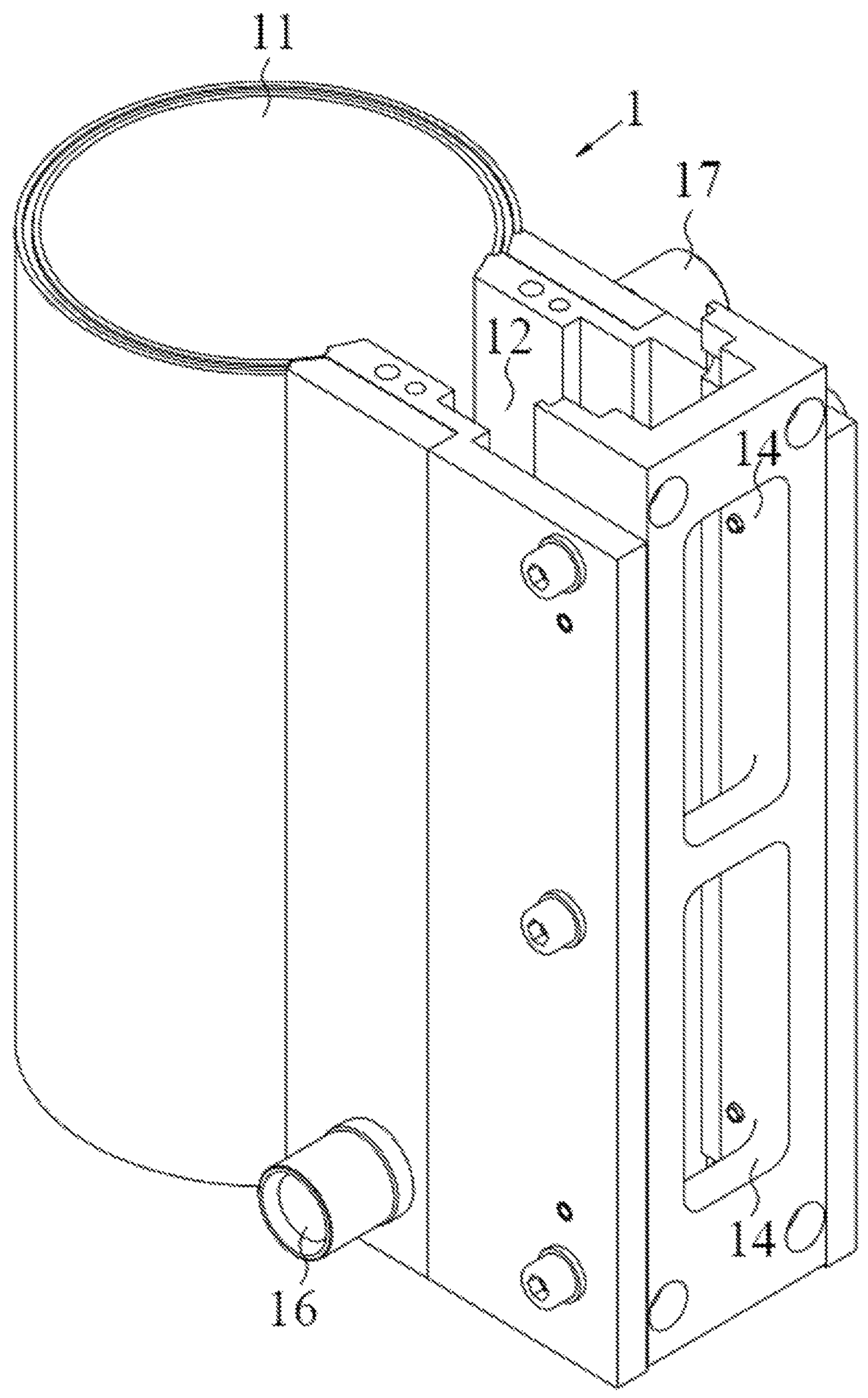
FIG. 6 is a perspective view of a cavity of FIG. 3.
Figure 7:
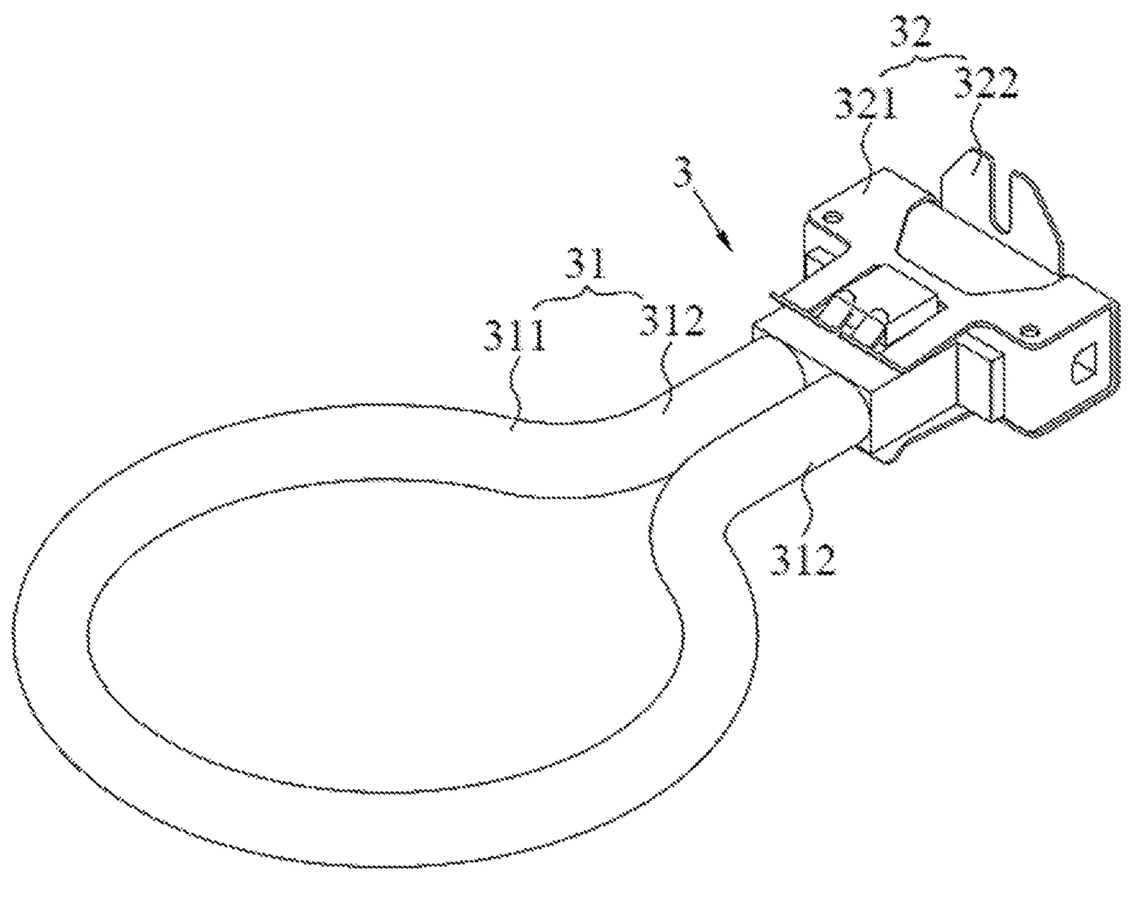
FIG. 7 is a perspective view of a heating lamp according to an embodiment of the present application.

To prevent the handle 102 from being deformed by heat, as shown in FIGS. 3 to 5, a bottle preform heating apparatus provided in an embodiment of the present application includes a cavity 1, a top cover 2 and multiple heating lamps 3. As shown in FIG. 6, a first receiving cavity 11 and a second receiving cavity 12 are formed in the cavity 1, the first receiving cavity 11 is cylindrical, and the second receiving cavity 12 is connected to a side surface of the first receiving cavity 11. As shown in FIG. 7, the heating lamp 3 includes a lamp tube 31 and a lamp base 32, the lamp tube 31 includes an arc portion 311 and two connection portions 312, an end of each connection portion of the two connection portions 312 is connected to the lamp base 32, another end of the each connection portion of the two connection portions 312 is connected to an end of the arc portion 311, the arc portion 311 is disposed in the first receiving cavity 11, the two connection portions 312 and the lamp base 32 are disposed in the second receiving cavity 12, the top cover 2 is disposed on top of the cavity 1, the top cover 2 is provided with a first through hole 21, the preform tube 101 of the bottle preform 100 may be inserted into the first receiving cavity 11 through the first through hole 21 and be surrounded by the arc portion 311, the radius of the first receiving cavity 11 is less than the distance between an end of a handle 102 of the bottle preform 100 facing away from the preform tube

101 and the central axis of the preform tube 101 so that the handle 102 cannot be placed into the first receiving cavity 11.

The bottle preform heating apparatus in this embodiment has a cavity 1 of a particular size such that the preform tube 101 of the bottle preform 100 can pass through the first through hole 21 on the top cover 2 so as to be inserted into the first receiving cavity 11 and surrounded by each heating lamp 3, while the handle 102 of the bottle preform 100 cannot be placed inside the cavity 1, and the heating lamps 3 heat only the preform tube 101, thereby preventing the handle 102 from being deformed by heat and thus creating conditions for subsequent smooth blowing of the bottle preform 100. Moreover, the shape of the cavity 1 matches the shape of the heating lamps 3 such that the arc portion 311 included in each heating lamp 3 and responsible for heating the preform tube 101 is disposed in the first receiving cavity 11, and the connection portions 312 and the lamp base 32 of each heating lamp 3 are disposed in the second receiving cavity 12, making the space in the cavity 1 fully utilized, thereby making the cavity 1 have a compact volume and occupy a small space and thus facilitating mounting.

As shown in FIGS. 3 to 5, the bottle preform heating apparatus also includes a mounting base 4, the mounting base 4 is detachably connected to the cavity 1, the mounting base 4 is disposed in the second receiving cavity 12, the mounting base 4 is provided with multiple fixing holes 41 disposed at intervals. As shown in FIG. 7, the lamp base 32 includes a lamp base body 321 and a fixing sheet 322, the fixing sheet 322 is provided with a U-shaped notch, and each heating lamp 3 is fixed to the mounting base 4 by a first screw 5 passing through the U-shaped notch and screwed in a corresponding fixing hole 41. The mounting base 4 is disposed so that all heating lamps 3 can be fixed to the mounting base 4, and then the mounting base 4 and the all heating lamps 3 can be placed into the cavity 1. In this manner, the heating lamps 3 are prevented from being mounted into the narrow space of the cavity 1 one by one. Thus, the assembly efficiency of the bottle preform heating apparatus is improved, and the assembly difficulty is reduced.

Figure 8:
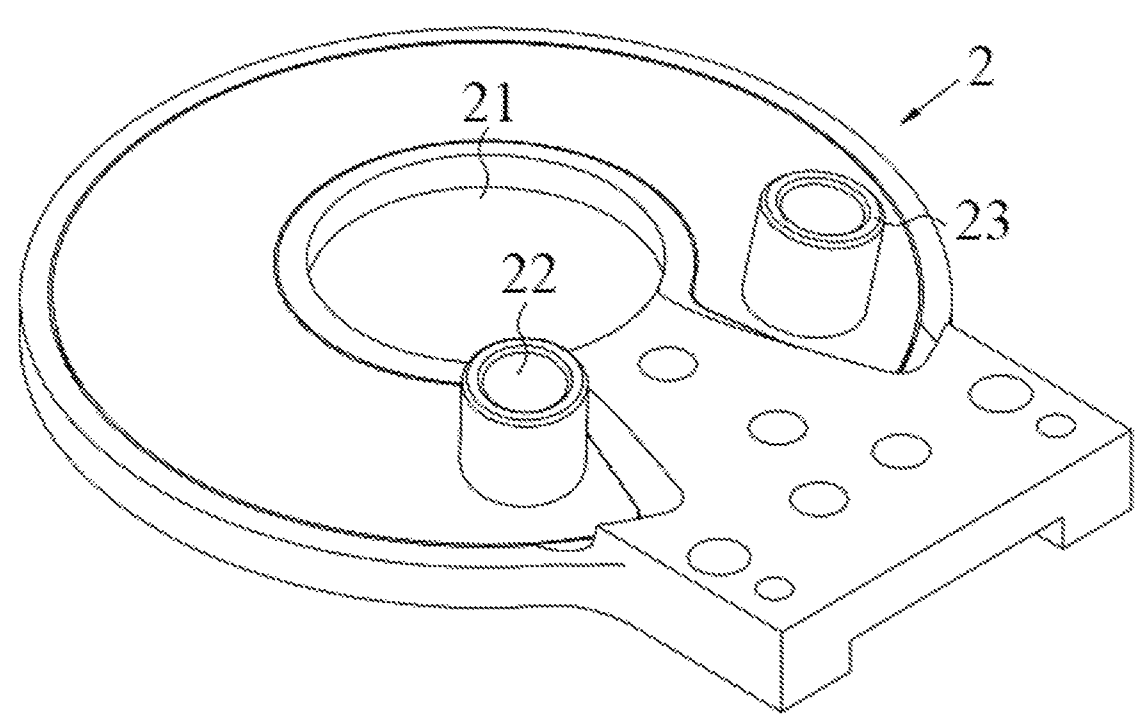
FIG. 8 is a perspective view of a top cover of FIG. 3.

As shown in FIGS. 4, 5 and 8, the bottle preform heating apparatus also includes multiple heat insulation rings 6. A heat insulation ring 6 may be placed between two adjacent lamp tubes 31 so that the heat insulation ring surrounds the periphery of the arc portion 311. The heat insulation ring 6 can block light emitted by the corresponding lamp tube 31 from striking the inner wall of the cavity 1 and reflect the light back into a heating region of the first receiving cavity 11 to improve the heating efficiency of the preform tube 101.

Figure 9:
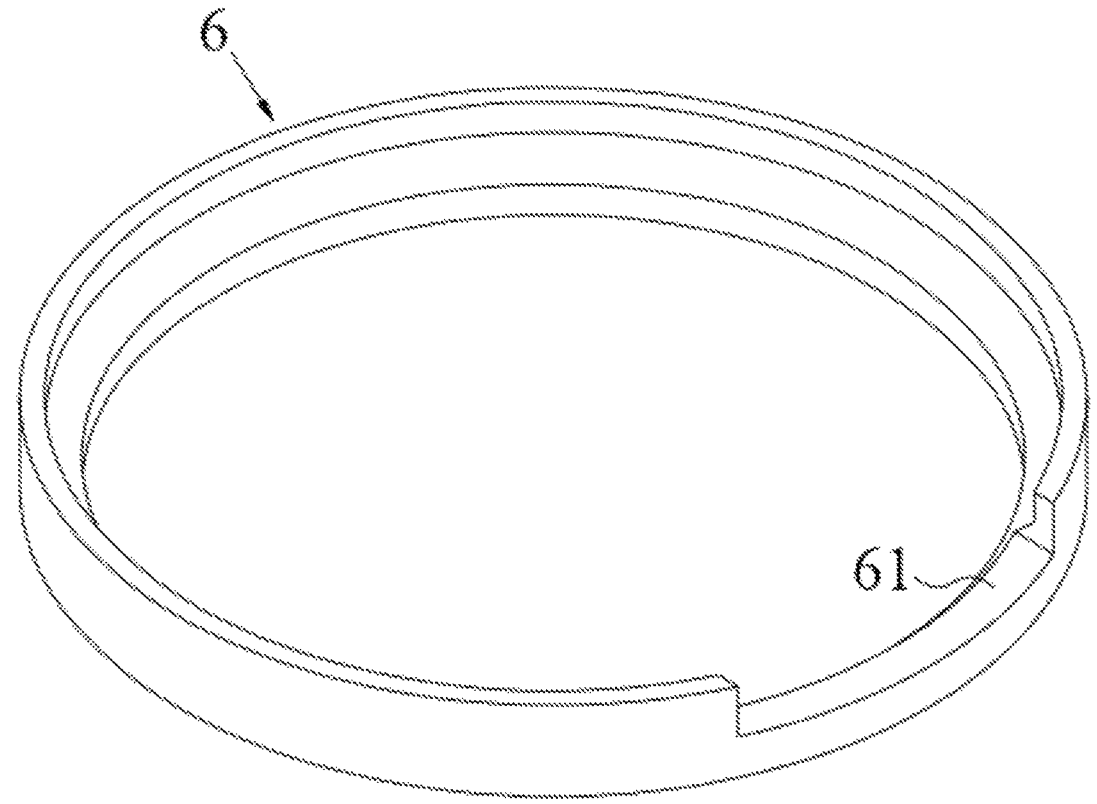
FIG. 9 is a perspective view of a heat insulation ring of FIG. 4.

Two heat insulation rings 6 may be placed between two adjacent lamp tubes 31. As shown in FIG. 9, the heat insulation ring 6 is provided with an indentation 61, and the two heat insulation rings 6 are stacked so that the two indentations 61 form an aperture for the lamp tube 31 to pass through. A spacing between two adjacent lamp tubes 31 is controlled so that the two heat insulation rings 6 stacked together can be right clamped between the two lamp tubes 31, and the heat insulation rings 6 can be prevented from easily falling out from between the lamp tubes 31.

The heat insulation rings 6 are spaced apart from the inner wall of the cavity 1 so that a heat insulation cavity 111 is formed between the heat insulation rings 6 and the cavity 1. The heat insulation cavity 111 is part of the first receiving cavity 11 and is located at the edge of the first receiving cavity 11. The heat insulation cavity 111 prevents the heat of the heat insulation rings 6 from being transmitted to the cavity 1 through the direct heat conduction so that the temperature of the cavity 1 is not too high, and the handle 102 located outside the cavity 1 can be protected from being deformed due to the high temperature.

Exemplarily, the bottle preform heating apparatus also includes a bottom plate 7 and an exhaust pipe 8. The bottom of the cavity 1 is disposed on the bottom plate 7. The exhaust pipe 8 is detachably connected to the bottom plate 7 through a second screw 9. The bottom plate 7 is provided with a second through hole (not shown). The exhaust pipe 8 passes through the second through hole and is inserted in the first receiving cavity 11. When the preform tube 101 is heated by the heating lamps 3, it is necessary to introduce external air to cool the preform tube 101 to prevent the preform tube 101 from having a too high temperature. The exhaust pipe 8 is used for connecting a fan so that a negative pressure can be formed inside the first receiving cavity 11, and the external air continuously can flow into the first receiving cavity 11.

As shown in FIG. 4, a gap 13 exists between the bottom of the top cover 2 and the top of the cavity 1, the gap 13 communicates with the heat insulation cavity 111, and the heat insulation cavity 111 communicates with the exhaust pipe 8. Exemplarily, the exhaust pipe 8 is provided with multiple third through holes 81, the multiple third through holes 81 communicate the exhaust pipe 8 with the heat insulation cavity111, and the external air enters the heat insulation cavity 111 through the gap 13 and then enters the inside of the exhaust pipe 8 through the third through holes 81. Therefore, an air curtain surrounding the heat insulation rings 6 is formed in the heat insulation cavity 111, which may take away a large amount of heat on surfaces of the heat insulation rings 6, and prevent a temperature of the inner wall of the cavity 1 from being too high to affect the handle 102.

As shown in FIG. 6, a side surface of the cavity 1 is provided with an air inlet hole 14, and the air inlet hole 14 communicates with the second receiving cavity 12. Apart from the entry of the external air into the cavity 1 from the gap 13, the external air may also enter into the cavity 1 from the air inlet hole 14 to cool the connection portions 312 of the lamp tube 31 and the lamp base 32, so as to prevent the lamp base 32 from being damaged by being overheated, and the hot air in the cavity 1 may only be discharged from the exhaust pipe 8, and will not be leaked from other places to affect the handle 102 of another bottle preform 100 on an adjacent bottle preform heating apparatus.

As shown in FIGS. 4 and 5, a first cooling cavity 15 is disposed within the cavity 1, a first water inlet 16 and a first water outlet 17 are disposed on the surface of the cavity 1, and both the first water inlet 16 and the first water outlet 17 communicates with the first cooling cavity 15. The cavity 1 has a double-layered structure, and cooling water passes from the first water inlet 16 into the first cooling cavity 15 and flows out of the first water outlet 17. The first water inlet 16 is disposed at a lower portion of a side surface of the cavity 1, and the first water outlet 17 is disposed at an upper portion of the side surface of the cavity 1, the cooling water can make lower the temperature of the cavity 1 so that the handle 102 outside the cavity 1 is not deformed due to the high temperature.

As shown in FIG. 8, a second cooling cavity (not shown) is disposed within the top cover 2, and a second water inlet 22 and a second water outlet 23 are disposed on the surface of the top cover 2, and the second water inlet 22 and the second water outlet 23 communicate with the second cooling cavity. A part of the handle 102 is located directly above the top cover 2, and the bottle opening 103 is also located directly above the top cover 2. If the temperature of the top cover 2 is too high, then the handle 102 and the bottle opening 103 will be affected. Therefore, it is necessary to cool the top cover 2 so that the temperature of the top cover 2 is not too high.

As shown in FIGS. 4 and 5, the central axis of the preform tube 101 inserted in the first receiving cavity 11 coincides with the central axis of the first receiving cavity 11 so that the preform tube 101 is in the middle of the first receiving cavity 11, and all parts of the surface of the preform tube 101 are identically distant from the respective arc portions 311 so that the preform tube 101 can be heated uniformly. When the preform tube 101 is being heated, the preform tube 101 may also be rotated in the first receiving cavity 11 by rotating the bottle opening 103 to heat the preform tube 101 uniformly.

In preferred solutions of the present application, the terms "preferred" and "further" herein mean that a feature, structure, material, or characteristic described in connection with an embodiment or example is included in at least one embodiment or example of the present application. In this description, illustrative expressions of these terms do not necessarily refer to the same embodiment or example. Moreover, features, structures, materials, or characteristics described may be combined in any one or more embodiments or examples in any suitable manner.

What is claimed is:

1. A bottle preform heating apparatus, comprising a cavity, a top cover, a plurality of heating lamps, a plurality of heat insulation rings, a bottom plate and an exhaust pipe, wherein a first receiving cavity and a second receiving cavity are formed in the cavity, the first receiving cavity is cylindrical, the second receiving cavity is connected to a side surface of the first receiving cavity, each of the plurality of heating lamps comprises a lamp tube and a lamp base, the lamp tube comprises an arc portion and two connection portions, an end of each connection portion of the two connection portions is connected to the lamp base, another end of the each connection portion is connected to an end of the arc portion, the arc portion is disposed in the first receiving cavity, the two connection portions and the lamp base are disposed in the second receiving cavity, the top cover is disposed on top of the cavity, the top cover is provided with a first through hole, a preform tube of a bottle preform is configured to pass through the first through hole so as to be inserted into the first receiving cavity and surrounded by the arc portion, a radius of the first receiving cavity is less than a distance between an end of a handle of the bottle preform facing away from the preform tube and a central axis of the preform tube, wherein a heat insulation ring of the plurality of heat insulation rings is configured to be placed between two adjacent lamp tubes to surround a periphery of an arc portion of each of the two adjacent lamp tubes, the plurality of heat insulation rings are spaced apart from an inner wall of the cavity so that a heat insulation cavity is formed between the plurality of heat insulation rings and the cavity, a bottom of the cavity is disposed on the bottom plate, the exhaust pipe is detachably connected to the bottom plate, the bottom plate is provided with a second through hole, and the exhaust pipe passes through the second through hole and is inserted in the first receiving cavity.

2. The bottle preform heating apparatus of claim 1, further comprising a mounting base, wherein the mounting base is detachably connected to the cavity, the mounting base is disposed in the second receiving cavity, the mounting base is provided with a plurality of fixing holes disposed at intervals, the lamp base comprises a fixing sheet, the fixing sheet is provided with a U-shaped notch, and the each of the plurality of heating lamps is fixed to the mounting base by a screw that passes through the U-shaped notch and that is screwed in a corresponding fixing hole of the plurality of fixing holes.

3. The bottle preform heating apparatus of claim 1, wherein a gap exists between a bottom of the top cover and a top of the cavity, the gap communicates with the heat insulation cavity, and the heat insulation cavity communicates with the exhaust pipe.

4. The bottle preform heating apparatus of claim 3, wherein a side surface of the cavity is provided with an air inlet hole, and the air inlet hole communicates with the second receiving cavity.

5. The bottle preform heating apparatus of claim 1, wherein a first cooling cavity is disposed within the cavity, a first water inlet and a first water outlet are disposed on a surface of the cavity, and the first water inlet and the first water outlet communicate with the first cooling cavity.

6. The bottle preform heating apparatus of claim 1, wherein a second cooling cavity is disposed within the top cover, and a second water inlet and a second water outlet are disposed on a surface of the top cover, and the second water inlet and the second water outlet communicate with the second cooling cavity.

7. The bottle preform heating apparatus of claim 1, wherein the central axis of the preform tube inserted in the first receiving cavity coincides with a central axis of the first receiving cavity.

* * * * *